Jan. 3, 1950     I. WOLFF     2,493,097
POSITION FINDER
Filed March 20, 1941     2 Sheets-Sheet 1
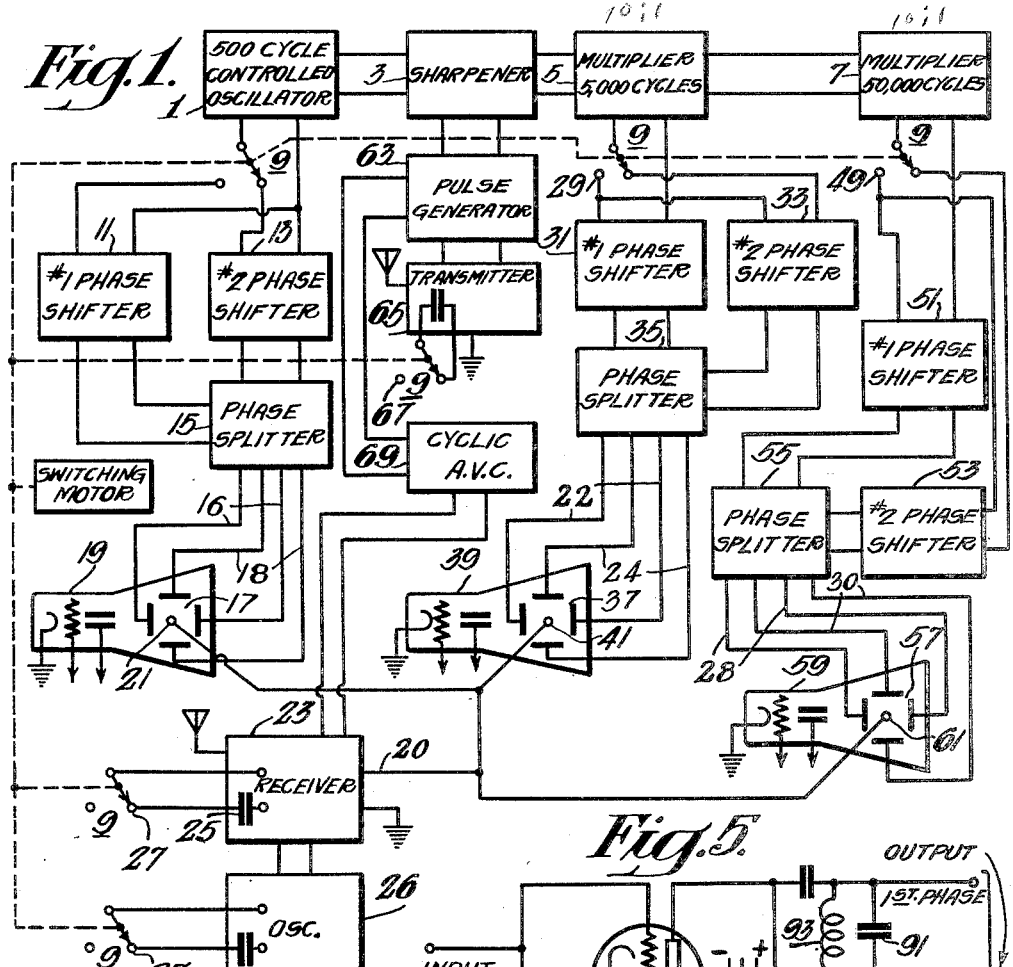
Fig. 1.
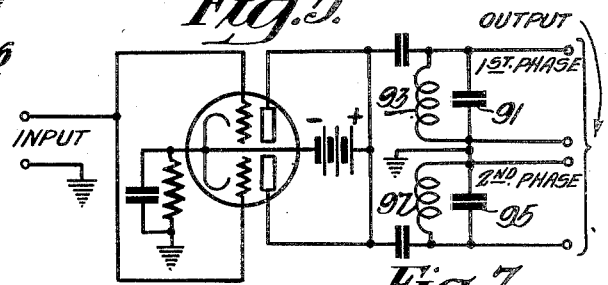
Fig. 5.
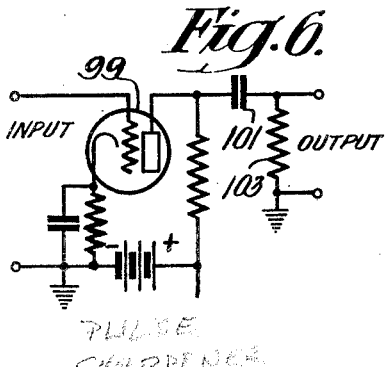
Fig. 6.
Fig. 7.
Inventor
Irving Wolff
Attorney Jan. 3, 1950     I. WOLFF     2,493,097
POSITION FINDER
Filed March 20, 1941     2 Sheets-Sheet 2
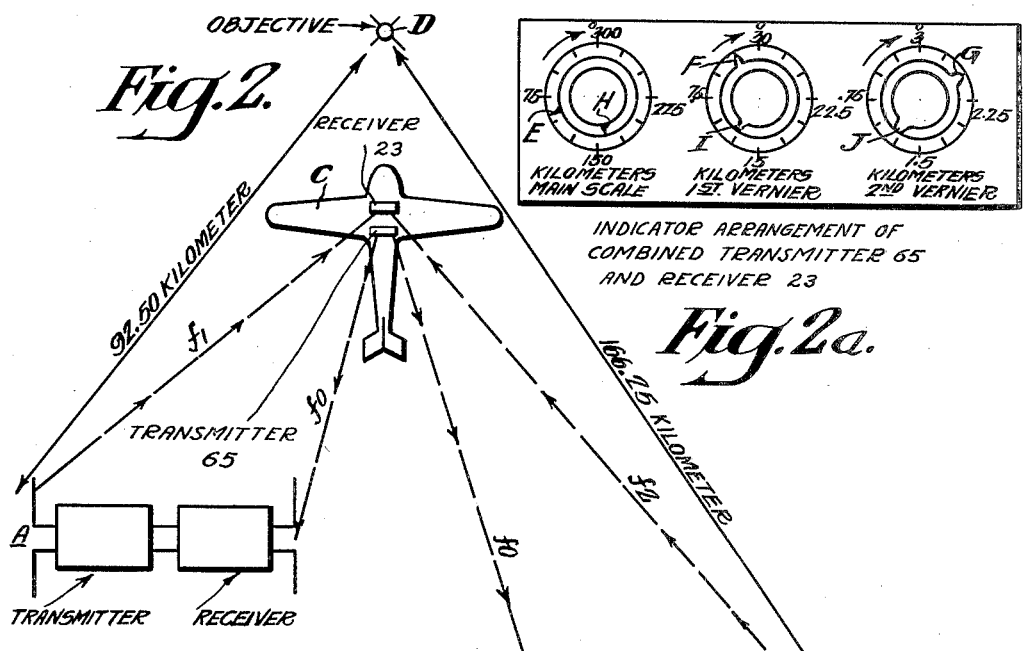
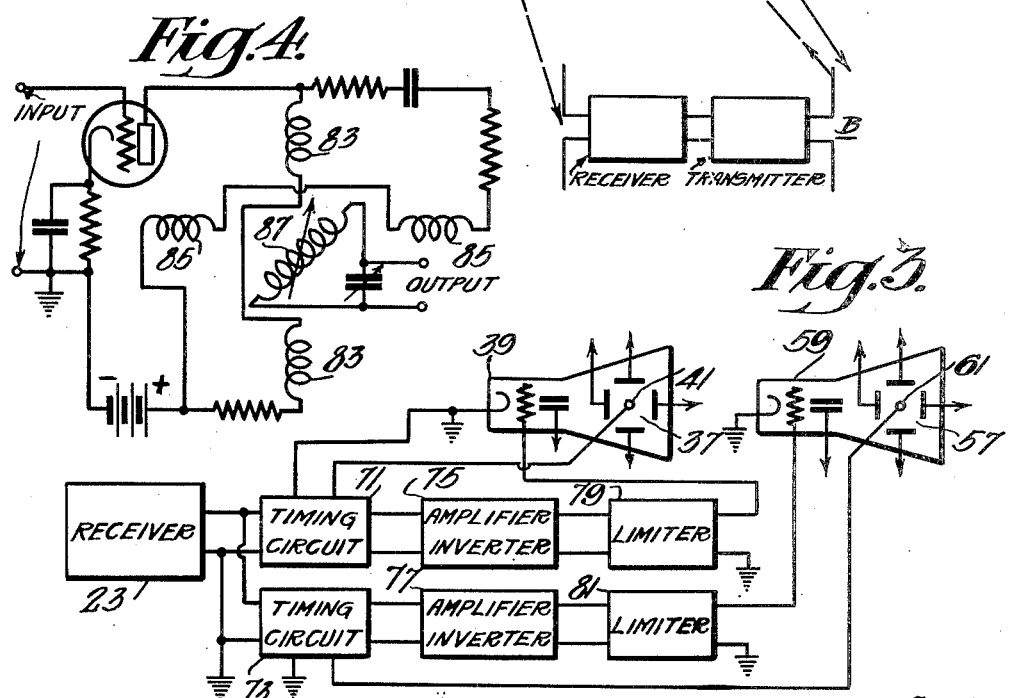
Inventor
Irving Wolff Patented Jan. 3, 1950

2,493,097

UNITED STATES PATENT OFFICE 2,493,097

POSITION FINDER

Irving Wolff, Merchantville, N. J., assignor to Radio Corporation of America, a corporation of Delaware Application March 20, 1941, Serial No. 384,323

21 Claims. (Cl. 343—15)

This invention relates to position finders and particularly to a position finder in which position is determined by observing the time required for radio pulses, originating at the unknown location, to travel to and from a pair of known locations.

In a copending application, Serial No. 329,434, filed April 13, 1940, now Patent No. 2,405,238, granted August 6, 1946, for "Position determining system," Stuart W. Seeley has described a position indicator in which an objective is located by radiating radio pulses from a craft bound for the objective, by receiving the pulses after they are repeated from known locations, and by then indicating the objective as a function of the pulse transmission of propagation time. The instant invention, while utilizing the broad concept of the Seeley application, provides a number of improvements. These improvements will be set forth as among the principal objects of this invention.

One of the objects of the invention is to provide an improved means for determining the position of a vehicle by timing the propagation of radio pulses to two known points. Another object is to provide an improved position finder employing two or more accurate vernier scales for timing pulse transmission. Another object is to provide means whereby the "time-distance location" of an objective and a vehicle may be indicated on the main and vernier scales of two or more cathode ray tubes.

The invention will be described by referring to the accompanying drawings in which Fig. 1 is a schematic block diagram of the combined transmitter and receiver used on the mobile station of one embodiment of the invention; Fig. 2 is a schematic diagram illustrating the operation of the invention: Fig. 2A is a sketch of the indicator used at the mobile station; Fig. 3 is a schematic circuit diagram of a modification used for brightening the cathode ray trace of the indicator; Fig. 4 is a schematic diagram of a phase shifter; Fig. 5 is a diagram of a phase splitter employed at the mobile station; Fig. 6 is a schematic diagram of a sharpener which forms a portion of the mobile station; and Fig. 7 is a circuit diagram of a delay network.

Similar reference numerals are applied to similar elements throughout the drawings.

Fig. 1 shows a 500 cycle frequency controlled oscillator 1 connected through a sharpener 3 to a frequency multiplier 5, which, by way of example, may multiply the frequency of the first oscillator ten times. The frequency multiplier 5 is connected to a second frequency multiplier 7, which may also multiply ten times. Thus there are made available three currents of 500, 5000 and 50,000 cycles. The oscillator 1 is connected alternately, by a synchronizing switch 9, to a pair of phase shifters 11 and 13. The phase shifters 11 and 13 are connected through a phase splitter 15 and the lines 16 and 18 to the rotational deflection electrode 17 of a first or main cathode ray tube 19. The cathode ray tube includes a radial deflecting electrode 21 which is connected through the line 20 to the output of a radio pulse receiver 23. The radio receiver may be any conventional type provided with tuning means 25 for adjusting the receiver alternately to a pair of pulses of different carrier frequency. If the receiver 23 is a superheterodyne, its input circuits and its local oscillator 26 may be tuned by capacitors connected and disconnected by suitable contacts 27 on the synchronizing switch 9.

The first multiplier 5 is connected alternately, by contacts 29 operated by the synchronizing switch, to a pair of phase shifters 31 and 33. The phase shifters 31, 33 are connected through a phase splitter 35 and the lines 22 and 24 to the rotational deflection electrodes 37 of a second or vernier cathode ray tube 39 or fractional indicator. The radial deflecting electrode 41 of the cathode ray tube 39 is connected through the line 20 to the radio pulse receiver 23. The second multiplier 7 is connected alternately, by contacts 49 operated by the synchronizing switch 9, to a pair of phase shifters 51, 53. These phase shifters 51, 53 are connected through a phase splitter 55 and the lines 28 and 30 to the rotational deflecting electrodes 57 of a third or vernier cathode ray tube 59 or fractional indicator. The radial deflecting electrode 61 is connected through the line 20 to the output of the radio receiver 23.

The sharpener 3 is connected to a pulse generator 63. The output of the pulse generator is applied to the transmitter 65, which may be arranged to radiate alternately pulses of different carrier frequencies. The carrier frequencies may be selected by switch contacts 67 which may be operated by the synchronizing switch 9. A suitable network 69 may be connected to the pulse generator for deriving therefrom a cyclic AVC of the type described in the copending application Serial No. 267,475, filed April 12, 1939, by Rogers M. Smith, for Radio echo distance measuring devices.

The operation of the system is as follows: A pair of radio repeater stations A and B are established at known locations indicated in Fig. 2. For each cycle of the 500 cycle oscillator 1, which along with the apparatus of Fig. 1 is located on the airplane C, pulses of radio frequency energy are radiated from the transmitter 65. The carrier frequency of these pulses is made $f_0$. The outgoing pulses of frequency $f_0$ will travel at 300,000 kilometers per second to be received at the relay stations, retransmitted by the relay station A and by the relay station B, converted into distinctive carriers $f_1$ and $f_2$ at the said relay stations, and thereafter received by the receiver 23, which is alternately operated at the two frequencies by means of the synchronous switch 9.

At the instant of the initial radiation the phase splitters 15, 35 and 55 apply potentials in quadrature phase to the respective rotational deflecting electrodes 17, 37, 57 of the cathode ray tubes 19, 39, and 59. These potentials cause the cathode ray beams to rotate in a clockwise direction as indicated in Fig. 2a. The beams in the respective cathode ray tubes will complete a rotational cycle in 2 milliseconds, .2 millisecond, and .02 millisecond, respectively, and will therefore provide a decade type of scale in which the main scale represents 300 kilometers, the first vernier scale 30 kilometers, and the second vernier scale 3 kilometers. The scales are dependent only upon the accuracy of the main frequency controlled oscillator and are independent of the carrier frequency.

Thus the cathode ray beams are rotated at constant angular speed and in the several cathode ray tubes at relative rates of 1:10:100 to provide accurate and easily readable scales. Now assume that the airplane C is to fly to an objective D which is 92.50 kilometers from A and 166.25 kilometers from B. The phase shifters 11, 31 and 33, which control the phase of the beams in their respective tubes 19, 39 and 59, are adjusted until the initial pulses of carrier frequency $f_0$ are retarded to 92.5 kilometers on the main scale, 2.5 kilometers on the first vernier, and 2.5 kilometers on the second vernier. Since 92.5 can not be read accurately on the main scale, it is only necessary to adjust the indication E to some point as near 92.5 as can be estimated. The indication F on the first vernier is determined by dividing 30 into 92.5 to obtain the remainder of 2.5 which is set as near as can be estimated. The indication G on the second vernier is set at exactly 2.5 which is determined by dividing 3 into 92.5 to obtain the remainder; i. e. 2.5.

In a similar manner, the indications H, I, J for the pulses of carrier which operates relay station B on frequency $f_2$ are set up to correspond to 166.25 kilometers, 16.25 (166.25÷30=150+16.25) kilometers, and 1.25 (166.25÷3=55+1.25) kilometers, respectively. If the relay stations interpose delays, within the relay apparatus, these delay times are constants which should be added to the set up distances. This may be determined by setting up the mobile device within a known distance from the relay and by noting the difference between the indicated and actual distances. If the airplane starts to fly toward an objective, the pulses radiated to A and to B will be retransmitted to the airplane and will be indicated on the several scales. As the distances increase the received indications on the main scale will approach the zero or other predetermined reference point, while the indications rotate ten times as fast and one hundred times as fast on the first and second verniers, respectively. If the airplane is flown so that the received indications E, F, G, H, I, and J all appear coincidentally at the zero or reference point on their respective scales, then the objective will be reached and the airplane position will be known to within the accuracy of the final vernier scale. It is not necessary to observe all six indications simultaneously because the indications may be observed in pairs as follows, E—H, then F—I, and finally the last vernier G—J. In the illustrative example, the distances may easily be read to the order of .1 kilometer or 100 meters.

It should be understood that the synchronous switch simultaneously operates the receiver at the proper carrier frequency and therefore tunes the receiver to the proper ground station, and establishes the proper phasal relations for the known distances. Instead of using one carrier frequency at the mobile transmitter, two carrier frequencies $f_1$ and $f_2$ may be used. In this case a single carrier frequency $f_0$ may be used for retransmission from both relays, allowing the receiver to be fixedly tuned. The synchronous switch is then used to tune simultaneously the transmitter and to select the proper phasing circuits.

To one familiar with radio echo distance measurements it will be clear that the advancement of the phase of the initial pulses will be gradually overcome as the pulses are delayed by their respective transit times until at the objective the initial advancement is exactly balanced by the time of transit. The transit times for the known distances may be readily predetermined by dividing twice the distance by the velocity of light; i. e.

$$\frac{2 \text{ times } X \text{ in meters}}{300} = \text{time in microseconds}$$

The scales may be made to correspond to any desired time or distance, which may be indicated in any units, by choosing the proper oscillator frequency.

The received indications may be distinguished in a number of ways, for example, the radius of the sweeps may be slightly different by introducing some attenuation in one of the sets of phase shifters. The cyclic AVC is used to decrease the receiver sensitivity at the instant of the outgoing pulse and thereafter to increase or restore the receiver sensitivity. While the receiver output may be sufficient to deflect radially the cathode ray beam, the visibility of the radial trace may be insufficient. In this case it is desirable to increase the intensity. The brilliancy of the radial trace may be increased by applying simultaneously to the cathode ray tube grid and radial deflecting electrodes voltages of opposite phase.

These voltages may be obtained by inserting the circuit of Fig. 3 between the receiver and the second and third cathode ray tubes. The receiver output is applied to timing circuits 71, 73. The timing circuits are connected through amplifier inverters 75, 77, respectively, to limiters 79, 81, respectively. Voltages from the timing circuit 71 are applied to the radial deflecting electrode 41 of tube 39; voltages from the second timing circuit 73 are applied to the radial deflecting electrode 61 of tube 59. The output from the first limiter 79 is applied to the grid of the tube 39; the output from the second limiter 81 is applied to the grid of tube 59. The foregoing circuit is so arranged that voltages of opposite phase are applied to the grid and deflecting electrodes so that the intensities of the respective beams of the cathode ray tubes are increased during radial deflections. If the foregoing precautions are not taken the radial trace on the second vernier tube will be found quite faint because the beam in the second vernier tube rotates 100 times for one radial deflection. The first vernier tube employs a beam which rotates ten times for one radial deflection and therefore while its radial trace may be sufficiently intense, increasing its intensity is preferable. These difficulties do not appear in the operation of the main cathode ray tube because the radial deflections of its beam occur once for every rotation of the beam.

Most of the units employed in the circuit of Fig. 1 are well known to those skilled in the art. The 500 cycle oscillator may employ a tuning fork, magnetostrictive element or any known means for controlling its frequency. The phase shifters may be of the type illustrated in the schematic diagram of Fig. 4. In this circuit two phase currents are applied to the stator coils 83 and 85, respectively. The variable phase current is determined by the position of the rotating coil 87. This type of phase shifter is disclosed in copending application Serial No. 196,863, filed March 19, 1938, now Patent No. 2,407,198, granted September 3, 1946, by Irving Wolff, for "Distance and directional determination system."

While the phase splitting circuits may employ serially connected capacitors and resistors the circuit of Fig. 5 is preferred. In this circuit the capacitor 91 and inductor 93 are tuned to shift the phase 45° while the capacitor 95 and inductor 97 are tuned to shift the phase 45° in the opposite direction whereby quadrature phase currents are obtained to produce a rotating field which rotates the cathode ray beam.

The sharpener circuit is illustrated in Fig. 6 in which the electronic tube 99 is biased to operate as a Class C stage. The voltages of sinusoidal form supplied to the input produce a current of square wave form in the output of the tube. These currents are differentiated by the network including capacitor 101 and resistor 103. The pulse generator and transmitter may be of the type disclosed in copending application Serial No. 182,418, filed December 30, 1937, now Patent No. 2,403,624, granted July 9, 1946, by Irving Wolff, for "Apparatus for and method of pulse keying." It should be understood that the invention is not limited to any particular type of pulse generator or transmitter. Likewise, the receiver may be of any known type. In the event that the circuit of Fig. 3 is employed the limiter may be any of the thermionic tubes operating on cut-off or saturation. The timing circuit may be omitted if the time delay through the amplifier inverter and limiter is negligible. In the event that a timing circuit is required, a properly terminated filter of the type shown in Fig. 7 may be used.

While the described system is based upon frequency multiplication for obtaining the vernier indications, the several indications may be obtained by frequency division. The relay stations may be omitted by substituting suitable reflectors, for example, as described in applicant's copending U. S. application Ser. No. 395,739 filed May 29, 1941. Furthermore, the invention is not limited to circular scales but may utilize linear scales.

I claim as my invention:

1. The method of locating a known position in accordance with the indications of main and vernier indicators of a radio receiver and transmitter located at an unknown movable position which includes locating known spaced points, determining the relative distances from said points to said position, converting said known distances into pulse propagation times, distinctively indicating said times on said main and vernier indicators by advancing the indications with respect to a single reference point on each indicator by the amount of said times, radiating pulses from said unknown position, receiving said pulses at said known points, retransmitting said pulses from said points, receiving distinguishably from said known points said retransmitted pulses at said unknown position, and moving said indicators and said radio receiver and transmitter toward the position to be located until all said indications coincide on the respective indicators and until the amount of each of said advances on said indicators is overcome by the times of propagation of said pulses.

2. The method of locating a known position as a function of a predetermined reference point and a pair of signal indications on a "time-distance" indicator of a radio receiver and transmitter located at an unknown movable position which includes determining the "time-distances" from said position to be located to a pair of known positions, advancing the pair of signal indications on said indicator from said predetermined reference point by the amounts corresponding respectively to said determined "time-distances," radiating pulses from said unknown position to determine the signal indicated distances to said known positions, moving said indicator and said radio receiver and transmitter along a course in which said signal indications approach each other and said predetermined reference point, and determining said position to be located by the coincidence of each of said signal indications and said predetermined reference point.

3. A position determining device responsive to distinctive signals from at least two fixed locations including a main distance indicator, a fractional distance indicator, a constant frequency device connected to said main indicator for operating said main indicator, means connected to said fractional indicator for operating said fractional indicator at a higher frequency, a pair of adjustable phase shifters connected to said constant frequency device, a second pair of adjustable phase shifters connected to said higher frequency means, and means for connecting alternately and effectively a phase shifter in each of said pairs between said constant frequency device and said main indicator and between said higher frequency means and said fractional indicator respectively so that the phase of each of a pair of signals may be independently adjusted on both said main indicator and on said fractional indicator.

4. A position indicating device including means for transmitting distance determining pulses from an unknown position, means for retransmitting said pulses from a plurality of relay stations located at known positions and distinguishable by a characteristic of said pulses, means located at said unknown position for receiving selectively said retransmitted pulses, a phase indicator, phasing means connected to said phase indicator, and means for connecting said phasing means alternately to said receiving means so that the phase of each of said received pulses may be simultaneously and distinctively indicated.

5. A position indicator including in combination a pulse transmitter, a pulse receiver, means connected to said pulse receiver for indicating the propagation times between transmission and reception of said pulses, means connected to said transmitter for altering the characteristic of a portion of said transmitted pulses, means connected to said indicating means for inserting independently in said indicating means two time factor circuits so that the correspondence between a predetermined mark and two indicated times will correspond to two predetermined "time-distances," means connected to and including said pulse receiver for receiving selectively said altered transmitted pulses, means for distinctively indicating at least two propagation times and means for indicating the coincidence of said predetermined mark and said two indicated propagation times to indicate position as a function of the times of pulse propagation from a pair of known locations.

6. A pulse receiver and indicator for receiving pulses propagated from at least two fixed locations for determining the position of said receiver including means for receiving distinguishably said pulses from each of said fixed locations, a plurality of cathode ray tubes, a source of local oscillations of substantially constant frequency, means connecting said source to one of said tubes for applying said oscillations to rotate its ray at said constant frequency, means for changing said oscillations of constant frequency into oscillations of another frequency, means connecting said frequency changing means to another of said tubes for applying said oscillations of changed frequency to rotate its ray at said changed frequency, and means connecting said receiving means to said tubes for applying said received pulses to produce simultaneous visual indications on each of said tubes to indicate differences in the times of reception of said pulses from said fixed locations for determining the position of said receiver in terms of the several time scales of said tubes.

7. A pulse receiver and indicator for receiving pulses propagated from at least two fixed locations for determining the position of said receiver including means for receiving distinguishably said pulses from each of said fixed locations, a plurality of cathode ray tubes, a source of local oscillations of substantially constant frequency, means connecting said source to one of said tubes for applying said oscillations to rotate its ray at said constant frequency, means for changing said oscillations of constant frequency into oscillations of a related frequency, means connecting said frequency changing means to another of said tubes for applying said oscillations of related frequency to rotate its ray at said related frequency, and means connecting said pulse receiving means to said tubes for applying said received pulses to produce simultaneous visual indications on each of said tubes to indicate differences in the times of reception of said pulses from said fixed locations for determining the position of said receiver in terms of the several time scales of said tubes.

8. A pulse receiver and indicator for receiving pulses propagated from at least two fixed locations for determining the position of said receiver including means for receiving distinguishably said pulses from each of said fixed locations, a plurality of cathode ray tubes, a source of local oscillations of substantially constant frequency, means connecting said source to one of said tubes for applying said oscillations to rotate its ray at said constant frequency, means for changing said oscillations of constant frequency into oscillations of a lower frequency, means connecting said frequency changing means to another of said tubes for applying said oscillations of lower frequency to rotate its ray at said lower frequency, and means connecting said pulse receiving means to said tubes for applying said received pulses to produce simultaneous visual indications on each of said tubes to indicate differences in the times of reception of said pulses from said fixed locations for determining the position of said receiver in terms of the several time scales of said tubes.

9. A device for indicating an unknown position with respect to a pair of relay stations at known locations including means for transmitting pulses from said unknown position to said relay stations, means located at each of said relay stations for retransmitting distinctive pulses in response to said pulses from said unknown position, means located at said unknown position for receiving said distinctive pulses from both of said relay stations, means including said receiving means for distinguishing between said received pulses from each of said relay stations, a main indicator for indicating distinctively and alternately the approximate times required for the propagation of said pulses to and from both of said relay stations, means for applying said received pulses to said main indicator, a first vernier indicator, and means effectively connecting said first vernier indicator to said receiving means for indicating distinctively and alternately in response to said received pulses fractional portions of said propagation times.

10. Apparatus of the type described in claim 9 including a second vernier indicator and means effectively connecting said second vernier indicator to said receiving means for indicating distinctively and alternately in response to said received pulses smaller fractional portions of said propagation times than indicated by said first vernier indicator.

11. A device for indicating an unknown position with respect to a pair of fixed locations including means located at said unknown position for transmitting pulses to said fixed locations, means located at each of said fixed locations for radiating pulses in response to said pulses from said unknown location, means at said unknown location for receiving said pulses from both of said fixed locations, means including said receiving means for distinguishing between said received pulses from each of said fixed locations, a main indicator for indicating distinctively and alternately the approximate times required for the propagation of said pulses to and from both of said fixed locations, means for applying said received pulses to said main indicator, a first vernier indicator, and means effectively connecting said first vernier indicator to said receiving means for indicating distinctively and alternately in response to said received pulses fractional portions of said propagation times.

12. Apparatus of the type described in claim 11 including a second vernier indicator and means effectively connecting said second vernier indicator to said receiving means for indicating distinctively and alternately in response to said received pulses smaller fractional portions of said propagation times than indicated by said first vernier indicator.

13. A device for indicating an unknown position with respect to two known fixed locations including means located at said unknown position for transmitting pulses to said fixed locations, means located at said fixed locations for returning pulses to said unknown position in response to said transmitted pulses, means located at said unknown position for receiving pulses returning from said fixed locations to said unknown location, means including said receiving means for distinguishing between said received pulses from each of said fixed locations, a first cathode ray tube indicator including cathode ray generating means, ray deflecting means and ray controlling means, means connected to said ray deflecting means for rotating said cathode ray at a constant frequency, means connecting said ray controlling means of said first cathode ray indicator to said receiver for indicating distinctively and alternately the times of propagation of said pulses to and from both of said fixed locations, a second cathode ray tube indicator including ray generating means, ray deflecting means and ray controlling means, means connected to said second ray deflecting means for rotating said second ray at a multiple of said constant frequency, and means effectively connecting said second ray controlling means of said second cathode ray indicator to said receiving means for indicating distinctively and alternately in response to said received pulses fractional portions of said propagation times.

14. Apparatus of the type described in claim 13 including a third cathode ray tube indicator having ray generating means, ray deflecting means and ray controlling means, means connected to said third cathode ray deflecting means for rotating said third ray at another multiple of said constant frequency, and means effectively connecting said ray controlling means of said third cathode ray indicator to said receiving means for indicating distinctively and alternately in response to said received pulses smaller fractional portions of said propagation times than indicated by said first and said second cathode ray indicators.

15. Apparatus of the type described in claim 13 including first phase adjusting means, means connecting said first phase adjusting means to said first cathode ray tube indicator deflecting means for adjusting the phase of said rotating beam to establish a predetermined distance scale upon said first cathode ray tube, second phase adjusting means, and means connecting said second phase adjusting means to said second cathode ray tube indicator deflecting means for establishing a second distance scale on said second cathode ray tube indicator.

16. Apparatus of the type described in claim 13 including a third cathode ray tube indicator having ray generating means, ray deflecting means and ray controlling means, means connected to said third cathode ray deflecting means for rotating said third ray at another multiple of said constant frequency, means effectively connecting said ray controlling means of said third cathode ray indicator to said receiving means for indicating distinctively and alternately in response to said received pulses smaller fractional portions of said propagation times than indicated by said first and said second cathode ray indicators, first phase adjusting means, means connecting said first phase adjusting means to said first cathode ray tube indicator deflecting means for adjusting the phase of said rotating beam to establish a predetermined distance scale upon said first cathode ray tube, second phase adjusting means, means connecting said second phase adjusting means to said second cathode ray tube indicator deflecting means for establishing a second distance scale on said second cathode ray tube indicator, third phase adjusting means, and means connecting said third phase adjusting means to said third cathode ray tube deflecting means for establishing a third distance scale on said third cathode ray tube indicator.

17. A device for indicating an unknown position with respect to two known fixed locations including means located at said unknown position for transmitting pulses to said fixed locations, means located at said fixed locations for returning pulses to said unknown position in response to said transmitted pulses, means located at said unknown position for receiving pulses returning from said fixed locations to said unknown location, means including said receiving means for distinguishing between said received pulses from each of said fixed locations, a first cathode ray tube indicator including cathode ray generating means, ray deflecting means and ray radially deflecting means, means connected to said ray deflecting means for rotating said cathode ray alternately on traces of different radii at a constant frequency, means connecting said ray radially deflecting means of said first cathode ray indicator to said receiver for indicating distinctively and alternately the times of propagation of said pulses to and from both of said fixed locations, a second cathode ray tube indicator including ray generating means, ray deflecting means and ray radially deflecting means, means connected to said second ray deflecting means for rotating said second ray alternately on traces of different radii at a multiple of said constant frequency, means effectively connecting said second ray radially deflecting means of said second cathode ray indicator to said receiving means for indicating distinctively and alternately in response to said received pulses fractional portions of said propagation times.

18. Apparatus of the type described in claim 17 including a third cathode ray tube indicator having ray generating means, ray deflecting means and ray radially deflecting means, means connected to said third cathode ray deflecting means for rotating said third ray alternately on traces of different radii at another multiple of said constant frequency, and means effectively connecting said ray radially deflecting means of said indicator to said receiving means for indicating distinctively and alternately in response to said received pulses smaller fractional portions of said propagation times than indicated by said first and said second cathode ray indicators.

19. Apparatus of the type described in claim 17 including means responsive to said transmitting means for advancing with respect to a zero reference mark on each of said indicators the time of said pulses to correspond, respectively, to a predetermined distance required for the propagation of said pulses from and returning to said transmission location.

20. Apparatus of the type described in claim 11 including a second vernier indicator and means effectively connecting said second vernier indicator to said receiving means for indicating distinctively and alternately in response to said received pulses smaller fractional portions of said propagation times than indicated by said first vernier indicator and means responsive to said transmitting means for advancing with respect to a zero reference mark on each of said indicators the time of said pulses to correspond, respectively, to a predetermined distance required for the propagation of said pulses from and returning to said transmission location.

21. The method of determining an unknown position with respect to two known points by means of radio transmitting and receiving apparatus at said position which includes emitting pulses from said unknown position, receiving said pulses at said two points, retransmitting said received pulses from each of said two points, receiving distinguishably from said two points said retransmitted pulses at said unknown position, indicating alternately and distinctively the respective times of propagation from said unknown point to and from said known points, indicating alternately and distinctively fractions of said respective propagation times, and determining said unkown position as a function of said times and fractional times.

IRVING WOLFF.

REFERENCES CITED

The following references are of record in the file of this patent:

UNITED STATES PATENTS

| Number | Name | Date |
| --- | --- | --- |
| 1,750,668 | Green | Mar. 18, 1930 |
| 2,098,287 | Gent | Nov. 9, 1937 |
| 2,118,518 | Neumann | May 24, 1938 |
| 2,134,716 | Gunn | Nov. 1, 1938 |
| 2,198,113 | Holmes | Apr. 23, 1940 |
| 2,225,046 | Hunter | Dec. 17, 1940 |
| 2,227,598 | Lyman et al. | Jan. 7, 1941 |
| 2,248,215 | Budenbom | July 8, 1941 |